Aug. 7, 1956
W. R. ISOM
2,757,569
FILM PULL-DOWN EQUALIZER
Filed May 28, 1953
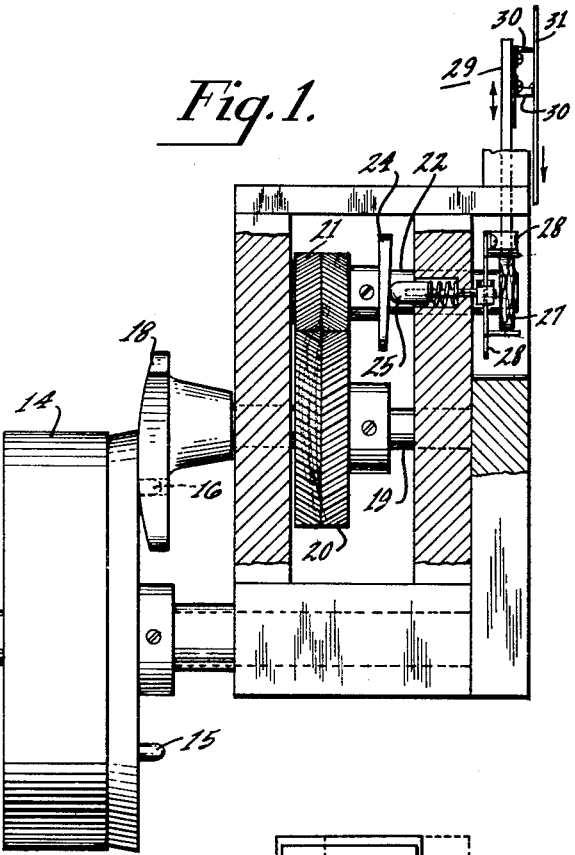
Fig. 1.
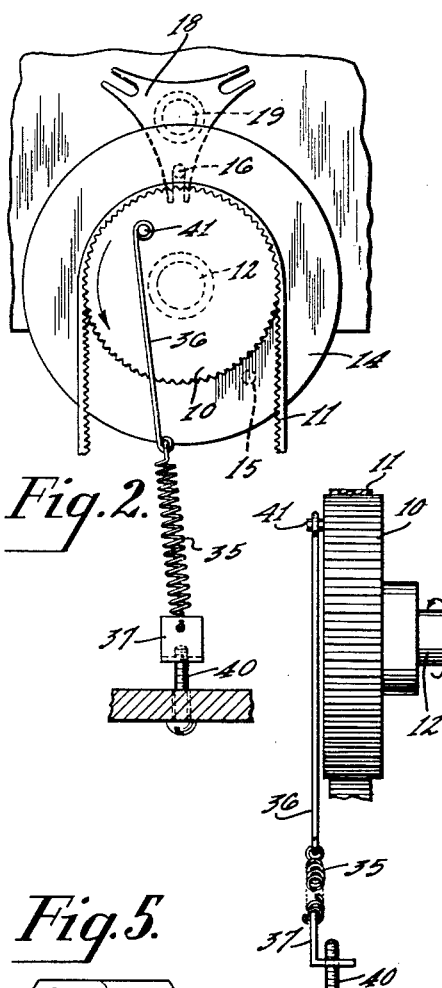
Fig. 2.
Fig. 5.
Fig. 4.
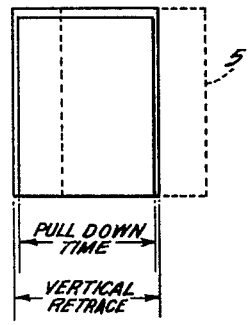
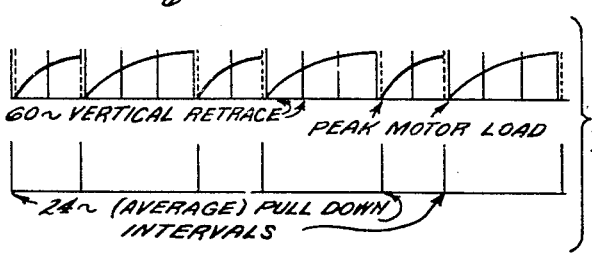
Fig. 3.
INVENTOR.
Warren R. Isom
BY
ATTORNEY United States Patent Office 2,757,569
Patented Aug. 7, 1956

2,757,569

FILM PULL-DOWN EQUALIZER

Warren R. Isom, West Collingswood, N. J., assignor to Radio Corporation of America, a corporation of Delaware Application May 28, 1953, Serial No. 358,155

6 Claims. (Cl. 88—18.4)

This invention relates to motion picture film intermittent advancing mechanisms, and particularly to such mechanisms for use in a projector for the "flying spot" type of television transmission.

In my co-pending U. S. application, Ser. No. 285,209, filed April 30, 1952, now U. S. Patent No. 2,712,771 of July 12, 1955, I disclose and claim a serial arrangement of a Geneva type intermittent and a cam-claw type intermittent to reduce the strain on the advancing mechanism when the rate of film advancement is particularly great. In such a system, the film reaches a speed of approximately 359 inches per second, and the pull-down cam is accelerated to nearly 15,000 R. P. M. and decelerated in one revolution. In such a system, regardless of the weight of the elements, there is considerable inertia. Energy is absorbed by the parts of the mechanism during acceleration and returned to the system during deceleration. However, more energy must be expended during acceleration than the moving parts can absorb. Of the energy that is stored in the moving parts, more is stored than is returned to the system because the frictional force during deceleration is also proportionately great. This frictional loss results in a shift in phase by the driving motor. Once the pull-down cycle has ended and its additional frictional load is no longer a burden on the motor, the motor has excessive torque with which it can recover the phase angle shift.

In the system shown in my above mentioned patent, the time between the pull-down cycles is alternately two-sixtieths of a second and three-sixtieths of a second, since the pull-down time must occur within the vertical retrace period, and motion picture speed of twenty-four frames per second must be transformed to thirty television fields per second. Thus, the motor recovers more during the long interval than it does during the shorter interval, and it is important that the motor recover to the same phase angle lag before each pull-down cycle begins. The phase relationship of the motor to the power line is the means for indexing the pull-down cycle of the film to the vertical retrace time of the television system. Any variation in this indexing results in the effective shortening of the time during retrace in which pull-down can take place if the resulting picture fault is to be avoided. Thus, the phase angle recovery from the irregular loading of the pull-down cycle should be made constant.

It has been found that the use of a large flywheel or a larger motor to solve the problem is impractical, since each would have to be so large as to introduce other undesirable conditions. The time that is available for the recovery of phase position by the motor is, in one instance, the two-sixtieths of a second between pull-down cycles minus the time that the motor is burdened with the frictional load of the intermittent mechanism. This is .014 of a second, leaving .019 of a second for recovery. In the second instance, it is three-sixtieths of a second between pull-down cycles minus .014 of a second for a recovery time of .036 of a second, which is almost twice that of the first instance. This means that the power required for the two cycles is different because the load is different, and that the motor recovers to an appropriate, but different, phase angle for each cycle.

The present invention solves the problem by mechanically transferring energy from the shorter cycle to the longer cycle. This is accomplished by using a spring energized during the long cycle to supply energy back into the system during the short cycle. This effectively transfers power from one cycle to the other, the amount of power transferred being determined by the constants of the spring.

The principal object of the invention, therefore, is to provide the proper phase relationship in an irregular type of rapid film pull-down mechanism.

Another object of the invention is to provide an improved rapid film pull-down mechanism utilizing the minimum of energy and apparatus.

A further object of the invention is to provide a rapid intermittent film pull-down system which will automatically transfer energy from a long pull-down cycle to a shorter pull-down cycle.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an elevational view, partly in cross-section, showing the combination Geneva and cam-claw pull-down mechanism embodying the invention.

Fig. 2 is an end view of the drive gear of the mechanism shown in Fig. 1 and showing the energy transfer unit.

Fig. 3 is a diagram showing the motor load cycles with respect to the vertical retrace times and also the irregular timing of the twenty-four cycle per second pull-down intervals.

Fig. 4 is a diagram in expanded form showing the distortion introduced by the variation in load on the motor, and Fig. 5 is a view showing the resulting distortion in a received television image.

Referring now to the drawings, in which the same numerals identify like elements, and referring particularly to Fig. 3, the lower chart shows the three to two ratio of film pull-down times to adjust the film speed of twenty-four picture frames per second to the thirty television fields per second. The upper chart shows the peak load placed on the motor during the short and long pull-down cycles, this load being much greater during the short pull-down interval than during the long pull-down interval. This is illustrated by the dotted lines for the short pull-down cycles coming prior to the vertical blanking and retrace times showing that the intermittent mechanism is not ready. The dotted lines for the longer pull-down cycles shows that the intermittent is more than ready at the vertical blanking times. Thus, the intermittent is alternately lagging and leading in phase with respect to the vertical retrace. It will be noted in Fig. 3 that the short cycle curves have a lower amplitude than the longer cycle curves, showing that, with the same acceleration, the motor cannot recover full speed in the shorter intervals.

In Fig. 4, this effect is expanded, the dotted line 5 showing the shift of the frame with respect to the vertical retrace times. The pull-down time period should be within the vertical retrace period, as shown by the full lines, the dotted line 5 showing that the pull-down leads the retrace period, and thus, a part of the pull-down occurs during the scanning period. This produces distortion at the bottom of the received image in the form of blurring, as shown at 6 in Fig. 5.

Referring now to Fig. 1, the same mechanism shown in Fig. 1 of my above mentioned patent is illustrated with the addition of the present invention.

In brief, this mechanism comprises a drive gear 10 on a shaft 12 which may be driven by a belt 11, the shaft 12 driving a pin wheel 14 having pins 15 and 16 spaced 144 degrees and 216 degrees from each other. The pins enter slots of and drive a star wheel 18 on a shaft 19 carrying a herring bone gear 20. This constitutes the Geneva section of the mechanism. The gear 20 is in mesh with a gear 21, these gears having a three to one ratio. The gear 21 drives a shaft 22, on which is an in-and-out cam 24 actuating a follower 25 and a constant diameter cam 27 actuating a follower 28. Attached to the follower 28 is a claw assembly 29 having teeth 30 for pulling down a film 31. This latter is the cam-claw section of the mechanism.

When the pins 15 and 16 engage the slots of the star wheel 18, they rotate the star wheel one-third of a revolution. This one-third revolution is multiplied to a full revolution of the cam shaft 22 by the three to one ratio of gears 20 and 21. Shaft 22 is accelerated at approximately 250,000 radians per second to reach a speed upward of 15,000 R. P. M., and decelerated in one revolution. It is this great acceleration which requires the large force which results in the great increase in the frictional load during the pull-down cycle. Since power is the rate at which work is done, more power is required during the shorter interval and less is needed during the longer interval.

This transfer of power is obtained by the use of a spring 35 having one end attached to a connecting rod 36 and its other end connected to one end of the leg of an L-shaped member 37 having a threaded opening in the other leg. Through the threaded opening is a screw 40 which may be rotated to adjust the tension in the spring 35. The other end of the connecting rod 36 is connected to the gear 10 by a pin 41 in a relationship with respect to the pins 15 and 16, as shown in Fig. 2. The location of the pin 41 in relation to pins 15 and 16 is such that the spring is energized during the long cycles and it supplies energy back into the system during the short cycles, as shown in Fig. 3. In this manner, power is effectively transferred from one cycle to the other.

In Fig. 2, the spring 35 is shown aiding the motor to recover its normal phase angle lag before the pin 15 contacts the star wheel 18. As soon as the pin 15 contacts and rotates the star wheel 18, the spring 35 begins to stretch and absorb energy, thereby preventing the motor from acquiring a different phase angle in relation to the power line than it had before pin 15 engaged the star wheel.

The amount of power transferred is determined by the constants of the spring 35. The amount needed can be calculated from the minimum power required to keep the system operating at twenty-four cycles per second, and it has been found in the present system that this power is of the order of one-twentieth horsepower. This corresponds to an average of 1.14 foot-pounds of work done per pull-down cycle, the average time for which is .0415 of a second, .318 foot-pound of which is accomplished during the time (.014 of a second) that the motor is burdened with the frictional load of the pull-down cycle. This leaves .76 foot-pound of work to be done in the recovery time of .019 of a second in one instance, and .036 of a second in the other instance. In the .019 of a second, the motor can do only .53 foot-pound of work, which leaves .23 foot-pound of work undone. However, in .036 of a second, .99 foot-pound can be done. This leaves a surplus of .23 foot-pound to be transferred from the long cycle with the long recovery time to that of the short cycle with the short recovery time. Thus, the product of the average force and the elongation of the spring must equal .23 foot-pound. The adjustment screw 40 is used to compensate for the variances in friction and for the tolerance of workmanship.

I claim:

1. A power transfer combination including an intermittent film advancing mechanism having rapid and irregular pull-down cycles comprising a Geneva intermittent section and a cam-claw intermittent section in series to pull down film, said Geneva section including a pin wheel adapted to rotate at a constant speed, and resilient means for absorbing energy from said wheel over a portion of its cycle and for returning energy to said wheel over another portion of its cycle to equalize the phase angle recovery of said pull-down cycles, said Geneva section including pins on said pin wheel positioned 144 degrees and 216 degrees apart and said resilient means being connected adjacent the rotational position of one of said pins to absorb energy during the 216 degree advancement of said pin wheel and return energy during the 144 degree advancement of said wheel, a gear being provided for rotating said pin wheel, said resilient means being a coil spring having one end attached adjacent the periphery of said gear and its other end anchored.

2. A power transfer combination including an intermittent film advancing mechanism having rapid and irregular pull-down cycles comprising a Geneva intermittent section and a cam-claw intermittent section in series to pull down film, said Geneva section including a pin wheel adapted to rotate at a constant speed, and resilient means for absorbing energy from said wheel over a portion of its cycle and for returning energy to said wheel over another portion of its cycle to equalize the phase angle recovery of said pull-down cycles, said Geneva section including pins on said pin wheel positioned 144 degrees and 216 degrees apart, a constant speed gear being provided for said wheel, said resilient means being a coil spring having one end connected adjacent the periphery of said gear and the rotational position of one of said pins and its other end anchored.

3. A power transfer combination including an intermittent film advancing mechanism having long and short periods between alternate pull-down cycles and adapted to be driven from a power source comprising a Geneva intermittent section and a cam-claw intermittent section in series to pull down film, said Geneva section including a pin wheel adapted to be driven at a constant speed by said power source, and resilient means for absorbing energy during rotation of said wheel over the portion of its cycle corresponding to the longer periods between said pull-down cycles and for returning energy during rotation of said wheel over another portion of its cycle corresponding to the shorter periods between said pull-down cycles to equalize the phase angle recovery of said pull-down cycles.

4. A power transfer combination including an intermittent film advancing mechanism in accordance with claim 3 in which said Geneva section includes pins on said pin wheel positioned substantially 144 degrees and substantially 216 degrees apart, and said resilient means is connected adjacent the rotational position of one of said pins to absorb energy during the 216 degree advancement of said pin wheel and to return energy during the 144 degree advancement of said pin wheel.

5. A rapid pull-down mechanism having different time periods between pull-down cycles and driven from a power source comprising a constant speed gear, a pin wheel rotated by said gear, pins on said wheel unequally spaced thereon, a star wheel actuated by said pins, a shaft driven by said star wheel, an in-and-out cam on said shaft, a pull-down cam on said shaft, means for rotating said shaft one revolution for each one-third revolution of said star wheel, and resilient means having one end permanently attached to said gear, said resilient means storing energy derived from said gear during the portion of its rotation corresponding to the longer periods between said pull-down cycles and supplying said energy to said gear during the remaining portion of its rotation corresponding to the shorter periods between said pull-down cycles.

6. A rapid pull-down mechanism in accordance with claim 5 in which said resilient means is a coil spring having its other end permanently anchored.

References Cited in the file of this patent

UNITED STATES PATENTS

| | | |
|---|---|---|
| 2,027,678 | Debrie | Jan. 14, 1936 |
| 2,051,602 | Holden | Aug. 18, 1936 |
| 2,346,070 | Fuller | Apr. 4, 1944 |
| 2,415,390 | Konkle | Feb. 4, 1947 |
| 2,475,622 | Kuehn | July 12, 1949 |